(12) United States Patent
Wang et al.

(10) Patent No.: US 11,353,995 B2
(45) Date of Patent: Jun. 7, 2022

(54) LASER-ABLATED GRADIENT REGION OF A TOUCHSCREEN

(71) Applicant: Elo Touch Solutions, Inc., Milpitas, CA (US)

(72) Inventors: ShiPeng Wang, Suzhou (CN); Joel C. Kent, Fremont, CA (US)

(73) Assignee: Elo Touch Solutions, Inc., Milpitas, CA (US)

(*) Notice: Subject to any disclaimer, the term of this patent is extended or adjusted under 35 U.S.C. 154(b) by 353 days.

(21) Appl. No.: 16/384,523

(22) Filed: Apr. 15, 2019

(65) Prior Publication Data
US 2020/0326794 A1   Oct. 15, 2020

(51) Int. Cl.
*G06F 3/044* (2006.01)
*G06F 1/16* (2006.01)
*B44C 1/22* (2006.01)
*B41M 5/24* (2006.01)

(52) U.S. Cl.
CPC ............ *G06F 3/044* (2013.01); *B44C 1/228* (2013.01); *G06F 1/16* (2013.01); *B41M 5/24* (2013.01); *G06F 2203/04103* (2013.01)

(58) Field of Classification Search
CPC .. G06F 1/16; G06F 2203/04103; G06F 3/044; B41M 5/24; B44C 1/228; B44C 3/005
USPC .................................................. 345/173–174
See application file for complete search history.

(56) References Cited

U.S. PATENT DOCUMENTS

| | | | | |
|---|---|---|---|---|
| 2009/0130607 | A1* | 5/2009 | Slater | H05K 3/0079 430/323 |
| 2013/0056244 | A1* | 3/2013 | Srinivas | H05K 1/09 174/250 |
| 2015/0033968 | A1* | 2/2015 | Derichs | B41F 5/24 101/481 |
| 2015/0286085 | A1* | 10/2015 | Davis | G02F 1/13338 349/12 |

(Continued)

OTHER PUBLICATIONS

International Search Report and Written Opinion directed to related International Application No. PCT/US2020/022237, dated Jun. 15, 2020; 13 pages.

*Primary Examiner* — Kwin Xie
(74) *Attorney, Agent, or Firm* — Sterne, Kessler, Goldstein & Fox P.L.L.C.

(57) ABSTRACT

Embodiments enhance graphic capabilities in projected-capacitive (PCAP) touch sensitive systems, and more specifically to a border component of a PCAP touchscreen. Embodiments include a method and an apparatus for a PCAP touchscreen layered structure. Some embodiments include screen printing a border component on a cover sheet, curing the border component, ablating a pattern on the border component, and screen printing one colored ink onto the pattern on the border component. In some embodiments the border layer is black, and the colored ink is coupled to a cover sheet. The pattern causes the colored ink to appear as a continuous gradient of the colored ink. In some embodiments the border component includes two or more border-layer components. At least one of the border-layer components may include an ablated pattern. Each ablated pattern may be coupled to a different colored ink.

20 Claims, 10 Drawing Sheets
(3 of 10 Drawing Sheet(s) Filed in Color)

(56) References Cited

U.S. PATENT DOCUMENTS

2018/0217668 A1\* 8/2018 Ligtenberg .......... G06F 3/04144
2019/0170925 A1\* 6/2019 Nichol ................. G02B 6/009

\* cited by examiner

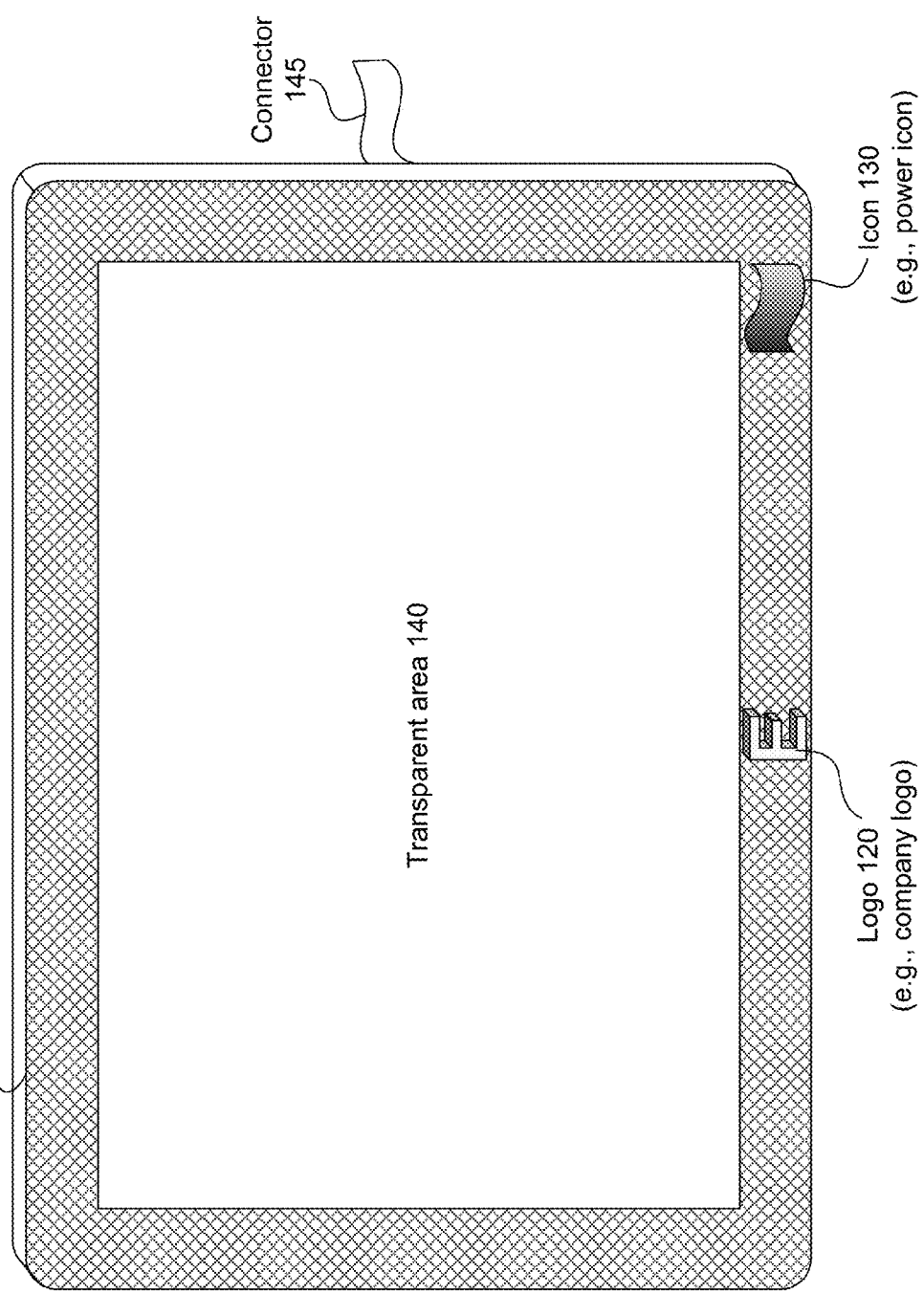

LASER-ABLATED GRADIENT REGION OF A TOUCHSCREEN

BACKGROUND

Field

The present disclosure relates generally to enhanced graphic capabilities in Projected capacitive (PCAP) touch sensitive systems, and more specifically to the border region of PCAP touchscreens.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is commonly utilized to support characteristics expected from touch interactions in touch/display interface devices.

Conventional approaches to creating logos or icons on a PCAP touchscreen includes the application and reapplication of multiple layers of color that includes mixing and matching color combinations that may be difficult to acquire. Screen printing method require printing a layer and then curing each layer, and the level of detail is not sharp. Photolithography methods are too expensive, particularly when the quantity of production is limited.

SUMMARY

Apparatus and method embodiments are provided for enhancing graphic capabilities in projected-capacitive (PCAP) touch sensitive systems, and more specifically to a border component of a PCAP touchscreen layered structure. Some embodiments include screen printing a border component on a cover sheet, curing the border component, ablating a pattern on the border component, and screen printing one colored ink onto the pattern on the border component, where the combination of the one colored ink and the pattern yields a gradient that includes more than one hue of the one colored ink, and where the more than one hue includes the one colored ink coupled to the coversheet. In some embodiments the border component is black or opaque, and the one colored ink is coupled to a cover sheet. The pattern causes the one colored ink to appear as a gradient of the one colored ink, and the one colored ink may be translucent or opaque.

In some embodiments the ablated pattern providing a degree of translucency includes ablated lines. The translucency of the ablated pattern may be determined by the width of the ablated lines divided by a pitch of the ablated lines. The pitch of the ablated lines may be measured from a center of the ablated line to a center of an adjacent ablated line. The ablated pattern may include the ablated line with a first width, and a second ablated line whose width is smaller than the first width of the ablated line. In some embodiments, the ablated pattern includes ablated dots. The translucency of the ablated pattern may be based on a diameter of the ablated dots and a pitch of the ablated dots. For example, the translucency of the abated pattern may be based on a square of the diameter of the ablated dot, divided by a square of the pitch of the ablated dot. The ablated pattern may include the diameter of the ablated dots and a second set of ablated dots, where the diameter of the second ablated dots is smaller than the diameter of the ablated dots.

The cover sheet forming the touch surface may be made of glass or film, and the PCAP touchscreen may also include a circuitry layer coupled to the cover sheet and the border component. The circuitry layer may include indium-tin-oxide (ITO), silver, and/or metal mesh.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The patent or application file contains at least one drawing executed in color. Copies of this patent or patent application publication with color drawing(s) will be provided by the Office upon request and payment of the necessary fee. The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 1 illustrates a front view of a projected capacitive (PCAP) touchscreen, according to example embodiments of the disclosure;

Figure 2A:
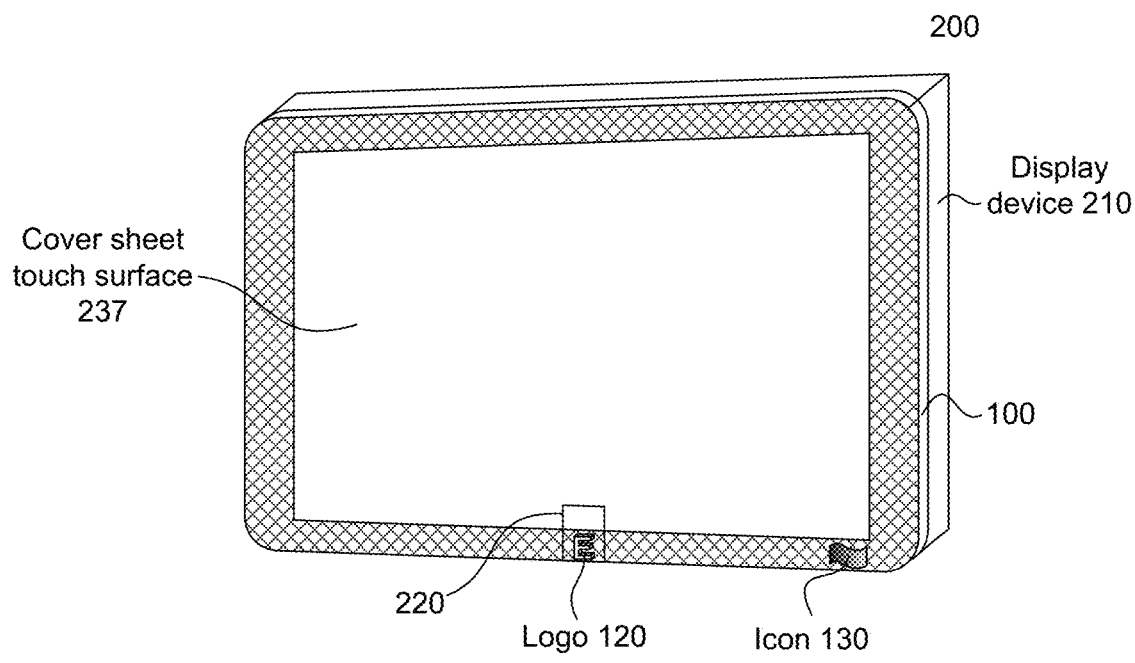
FIG. 2A illustrates a combination of a PCAP touchscreen with a display device, according to an exemplary embodiment of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Some embodiments include an apparatus and a method for using laser ablation to create translucent regions within an opaque border layer on a projected-capacitive (PCAP) touch sensitive systems such as a PCAP touchscreen. For example, embodiments include using laser ablation to make a selected region of a border layer translucent and enable gradients of translucency. Further, in some embodiments, one color (not counting the border layer color) may be applied to the selected region of the border layer to produce a gradient of shades of the one color. The gradient of shades may be so fine as to appear to the human eye as a continuous and gradual gradient of the one color (which might be shades of gray including white). While black is the most common color of the border layer, other border layer colors are possible such as white, pink, etc.

FIG. 1 illustrates a front view of a projected capacitive (PCAP) touchscreen 100, according to example embodiments of the disclosure. PCAP touchscreen 100 may be placed in front of a monitor or display device, for example. PCAP touchscreen 100 includes border layer 110 that may be any color, such as black. In this disclosure, border layer 110 is shown as a cross-hatched pattern for illustration convenience, and not a limitation. PCAP touchscreen 100 also includes connector 145 that connects to a display device. PCAP touchscreen 100 includes logo 120, icon 130, and transparent area 140 for viewing contents of the display device. Logo 120 and icon 130 may be located at any location within border layer 110. Logo 120 and icon 130 may be similar or different from each other.

FIG. 2A illustrates combination 200 of PCAP touchscreen 100 with display device 210, according to an exemplary embodiment of the disclosure. For explanation purposes, FIG. 2A may be described with elements from previous figures. PCAP touchscreen 100 is placed in front of display device 210 and electronically coupled to display device 210 via connector 145 (not shown.) Display device 210 may include but is not limited to a computing device, a computer, a laptop, a tablet, and/or a mobile computing device. For example, a user can interact with software applications on display device 210 by touching cover sheet touch surface 237 of touchscreen 100. Cross-section 220 of PCAP touchscreen 100 that includes logo 120 is described further in FIG. 2B.

Figure 2B:
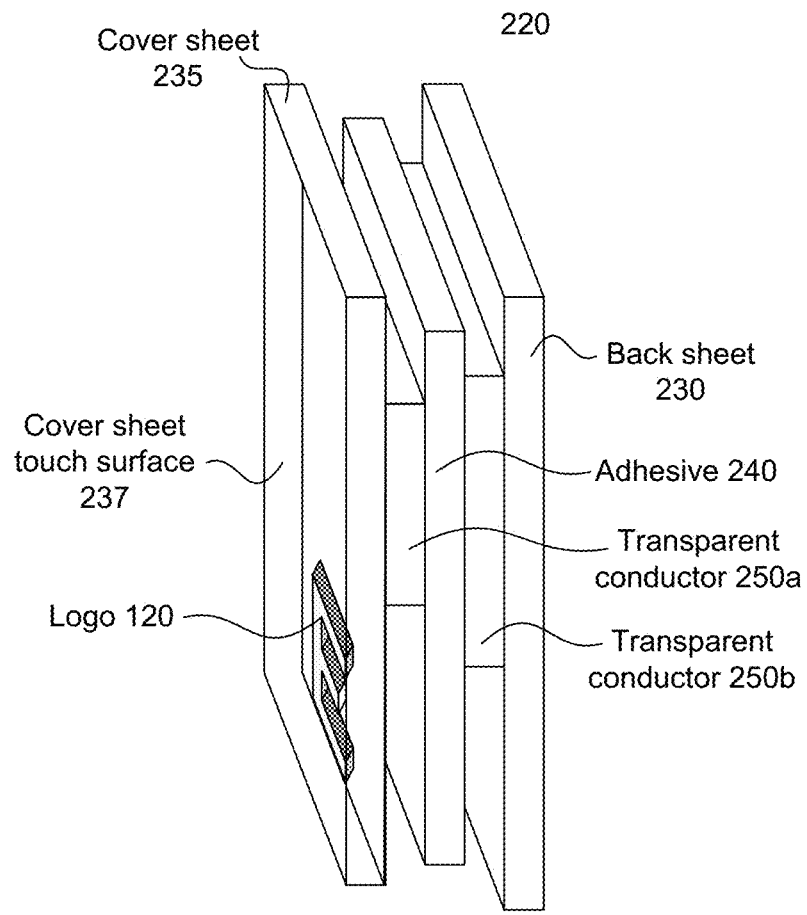
FIG. 2B illustrates a cross-section of a PCAP touchscreen, according to an exemplary embodiment of the disclosure.

FIG. 2B illustrates cross-section 220 of PCAP touchscreen 100, according to an exemplary embodiment of the disclosure. For explanation purposes, FIG. 2B may be described with elements from previous figures. Cross-section 220 illustrates a two glass solution (2GS) implemented for touchscreen 100. Other implementations include but are not limited to a glass-film-film (GFF) solution and a three glass (3GS) solution. Cross-section 220 may include cover sheet 235, transparent conductor 250a, adhesive layer 240, transparent conductor 250b, and back sheet 230. A user interacts with touchscreen 100 by touching cover sheet touch surface 237. Information from the touch on cover sheet touch surface 237 are collected via transparent conductor 250a and 250b, and conveyed to display device 210 electronically. In this example, logo 120, the 3-D-style letter "E", is found on the underside of cover sheet 235. A cross-section of cover sheet 235 that includes logo 120 is described further in FIG. 3A.

Adhesive layer 240 may be a solid optically clear adhesive (OCA) that can be an acrylic-based adhesive, a silicone-based adhesive, polyvinyl butyral (PVB), ethylene-vinyl acetate (EVA), or any other suitable OCA that will be recognized by those skilled in the relevant art(s). Transparent conductors 250a and 250b are circuitry layers that may include electrodes, routing traces, and trace shields of materials such as indium-tin-oxide (ITO), silver, and/or metal mesh. (The transparent conductors 250a and 250b are typically microscopically thin, but for clarity they are not drawn to scale in FIG. 2B. Furthermore, there is no air gap between adhesive 240 and cover sheet 235 or back sheet 230; the adhesive 240 conforms to the inside surfaces of cover sheet 235 and back sheet 230.)

Figure 3A:
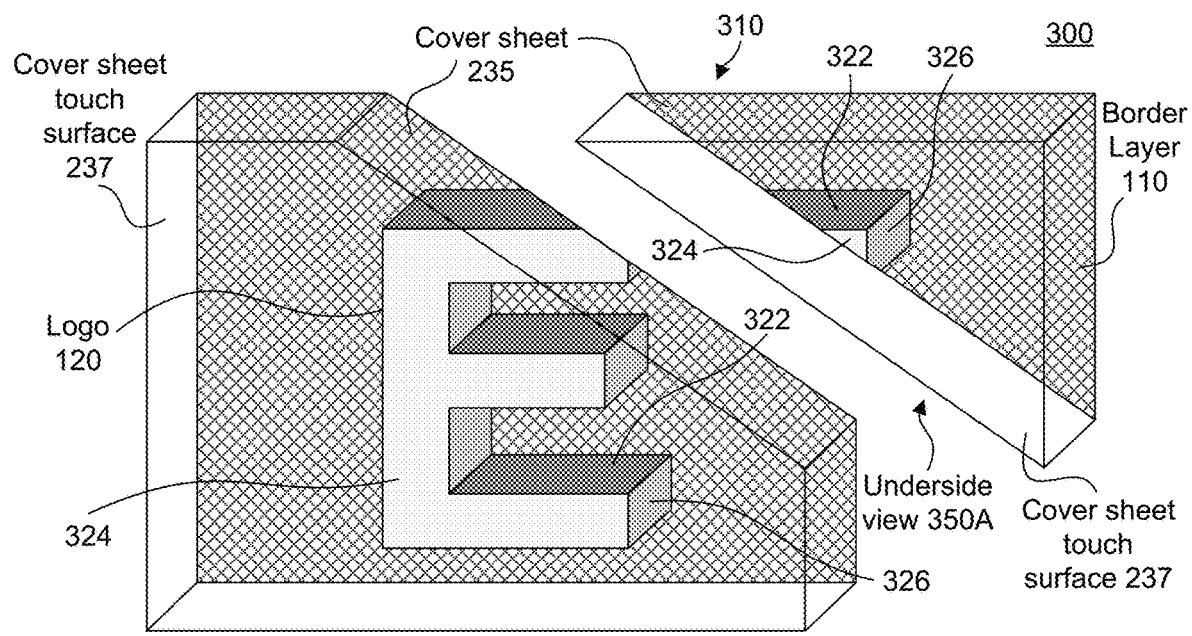
FIG. 3A illustrates a cross-section example of a cover sheet, according to an exemplary embodiment of the disclosure.

FIG. 3A illustrates example cross-section 300 of cover sheet 235 according to an exemplary embodiment of the disclosure. For explanatory purposes, FIG. 3A may be described with elements from previous figures. Cross-section 300 includes a portion of cover sheet 235 that has been cut. Cover sheet touch surface 237 is the portion of cover sheet 235 that a user touches. Logo 120 and border layer 110 are located on the underside of cover sheet 235. Top portion 310 of cross-section 300 includes the upper right tip of the 3-D-style letter "E", and includes the following colors: 322, 324, 326, and border layer 110. In this example, border layer 110 is shown as a cross-hatched pattern, but could be any color such as black. If top portion 310 is brought together with the remaining portion of cross-section 300 to make logo 120 whole, underside view 350A is the rectangular portion that would physically touch the remaining portion of cross-section 300. Underside view 350A is described further in FIGS. 3B and 3C.

Figure 3B:
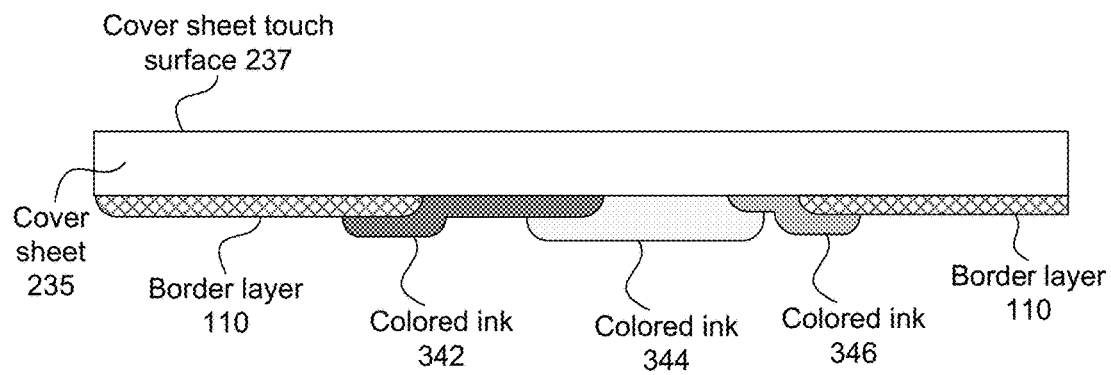
FIG. 3B illustrates a stack-up of a cross-section of a logo.

FIG. 3B illustrates a stack-up 350B of a cross-section of logo 120. For explanation purposes, FIG. 3B may be described with elements from previous figures. Stack-up 350B may correspond with underside view 350A when top portion 310 of FIG. 3A is tipped away from the viewer, resulting in coversheet touch surface 237 being on top. Stack-up 350B includes cover sheet 235 which may be made of glass or film and the user interacts with touchscreen 100 by touching cover sheet touch surface 237. Screen printing layers of border layer 110, and three different layers of colored inks 342, 344, and 346 can be applied to the underside of cover sheet 235 one layer at a time. Color ink 342 correlates with color 322 of the apparent horizontal plane of the 3-D-style letter "E" of logo 120; color ink 344 correlates with color 324 of the apparent front face of the 3-D-style letter "E" of logo 120; and color ink 346 correlates with color 326 of the apparent vertical plane of the 3-D-style letter "E" of logo 120.

Figure 3C:
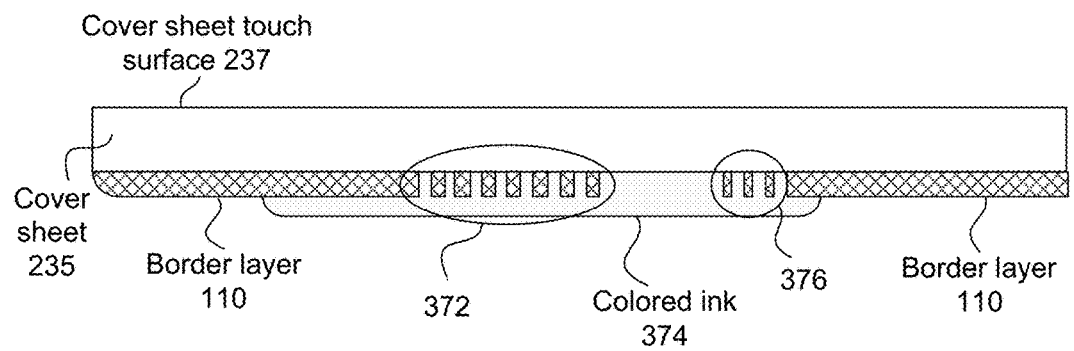
FIG. 3C illustrates an exemplary stack-up of a cross-section of a logo with a single border-layer component, according to an exemplary embodiment of the disclosure.

There are difficulties with stack-up 350B with regards to timing, procuring and matching colored inks, and the resolution of the printing: First, stack-up 350B requires individually screen printing an ink layer and then curing the ink layer for each color ink. For example, starting with border layer 110 that is printed on cover sheet 235, then border layer 110 is cured. This is followed by the printing and curing of each of the different colored inks 342, 344, and 346 in separate layers. Second, matching the pigments for each of the different colored inks 342, 344, and 346 to be compatible colors may be difficult, especially when the different colors are obtained from different sources. And third, the resolution of placing the different colored inks 342, 344, and 346 may not be precise, and the edges are not sharp or crisp. Using photolithography may produce sharper edges than screen printing, but the tooling costs for photolithography are expensive FIG. 3C illustrates an exemplary stack-up 350C of a cross-section of logo 120 with a single border layer component, according to an exemplary embodiment of the disclosure. For explanation purposes, FIG. 3C may be described with elements from previous figures. Exemplary stack-up 350C corresponds with underside view 350A when top portion 310 of FIG. 3A is tipped away from the viewer resulting in coversheet touch surface 237 being on top. Exemplary stack-up 350C includes cover sheet 235 which may be made of glass or film and the user interacts with touchscreen 100 by touching cover sheet touch surface 237. Exemplary stack-up 350C also includes border layer 110, ablated patterns 372 and 376, and one (e.g., one and only one) colored ink, colored ink 374. In contrast to stack-up 350B, exemplary stack-up 350C utilizes two inks instead of four inks. The two inks include border layer 110 ink, shown as a cross-hatched pattern, which in this example could be black, and one (e.g., one and only one) colored ink, colored ink 374. Two additional shades of colored ink 374 are achieved by different translucent ablated patterns: ablated pattern 372 and ablated pattern 376. Having less colored inks results in less physical masks, less printing, and less curing, resulting in a shorter overall process. Because one (e.g., one and only one) colored ink is used, colored ink 374, exemplary stack-up 350C removes the problem of obtaining compatible colored inks and matching pigments. And finally, ablation (e.g., laser ablation) enables fine lines with sharp edges that are adjustable. Unlike stack-up 350B, no physical masks are created for screen printing the one (e.g., one and only one) colored ink, colored ink 374. The tooling may include laser programming that may be downloaded into laser equipment, which may be low-cost compared to photolithography tooling.

Figure 10:
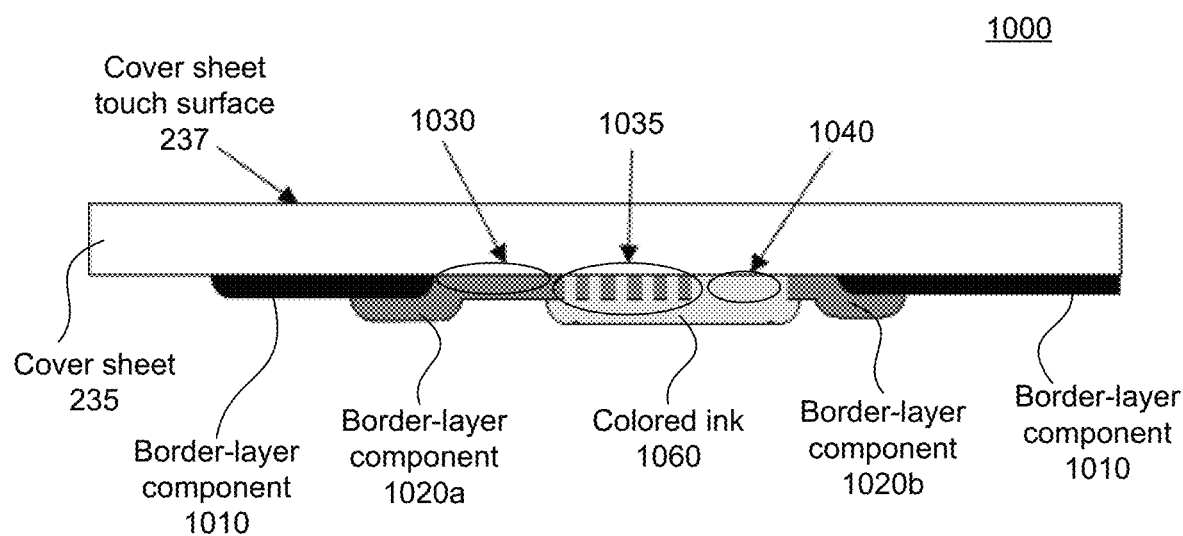
FIG. 10 illustrates an exemplary stack-up of a cross-section of a logo with two border-layer components, according to an exemplary embodiment of the disclosure.

As illustrated in FIG. 3C, border layer 110 may have a single border-layer component. Alternatively, border layer 110 may have two or more components. FIG. 10 illustrates an exemplary stack-up 1000 of a cross-section of logo 120 with two border layer components, according to an exemplary embodiment of the disclosure. In this example, border layer 110 has two components, border-layer component 1010 and border-layer component 1020. Three regions of border-layer component 1020 are illustrated. Region 1030 is an area in which no border-layer component 1020a material is removed. Region 1035 is an area in which border-layer component 1020a is partially removed in a pattern (e.g., border-layer component 1020a is ablated in a pattern.) Region 1040 is an area in which border-layer component 1020a is entirely removed. Colored ink 1060 is added at least over region 1035 and region 1040 where border-layer component 1020a material is at least partially removed. As an example, border-layer component 1010 may be black, border-layer component 1020a and 1020b may be yellow and colored ink 1060 may be red. In this case, the perimeter border of touchscreen 100 will generally be perceived as black, and orange as well as yellow and red colors will be perceived within logo 120. In particular, region 1030 will be perceived as yellow, region 1040 as red, and region 1035 as orange due to the limited resolution of the human eye mixing the yellow and red colors. If the colored ink is blue rather than red, then region 1030 will be yellow, region 1040 will be blue, and region 1035 will be green due to the human eye mixing yellow and blue colors.

Accordingly, in some embodiments, the border component may have two or more border-layer components, and one or more of the border-layer components may include an ablation pattern. Each ablation pattern may be coupled to a different colored ink. In general, as a result of the ablated patterns, the number of colors or hues perceived by the user exceeds the number of border-layer components plus the number of colored inks.

Figure 4:
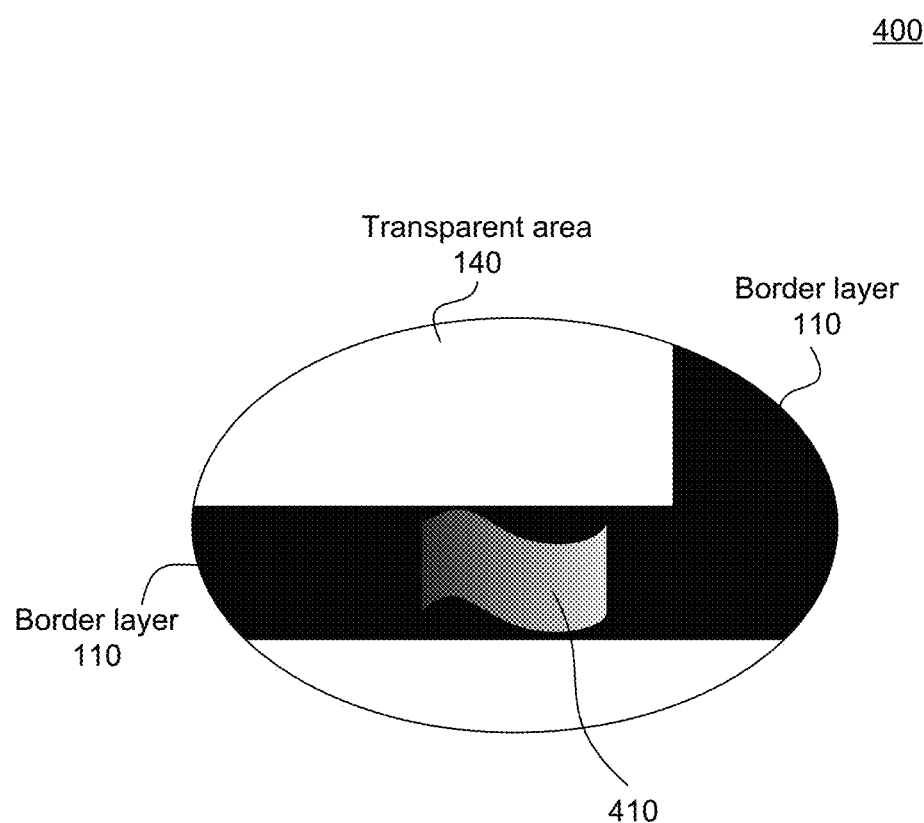
FIG. 4 illustrates an exemplary example of an icon, according to an exemplary embodiment of the disclosure.

FIG. 4 illustrates another exemplary example 400 of icon 410, according to an exemplary embodiment of the disclosure. For explanation purposes, FIG. 4 may be described with elements from previous figures. Example 400 includes transparent area 140, border layer 110, and icon 410 which may be equivalent to icon 130 of FIG. 1. Icon 410 comprises: a gradient pattern ablated from a portion of border layer 110 which in this example is black, and one (e.g., one and only one) colored ink, green in this example. The colored ink may be opaque or translucent. In some embodiments, the gradient pattern is gradual and the application of the one and only one colored ink to the gradient pattern makes icon 410 appear to include multiple colored inks of continuous gradient shades of the one and only one colored ink shade. The ablated pattern may include ablated lines (e.g., laser-ablated lines) and/or ablated dots (e.g., laser-ablated dots), such that when the one and only one color, green in this case, is applied to the gradient pattern, the result is a translucent gradation of color which would be difficult and expensive to achieve with a screen printing method. And as described above, the embodiments are less expensive to implement than photolithography tooling costs.

In some embodiments (not shown), border layer 110 may be applied to a combination of cover sheet 235 and portions of transparent conductor 250a of FIG. 2B. Various ablation patterns may be applied to border layer 110 and/or transparent conductor 250a to achieve the design for logo 120 and/or icon 130.

Figure 5:
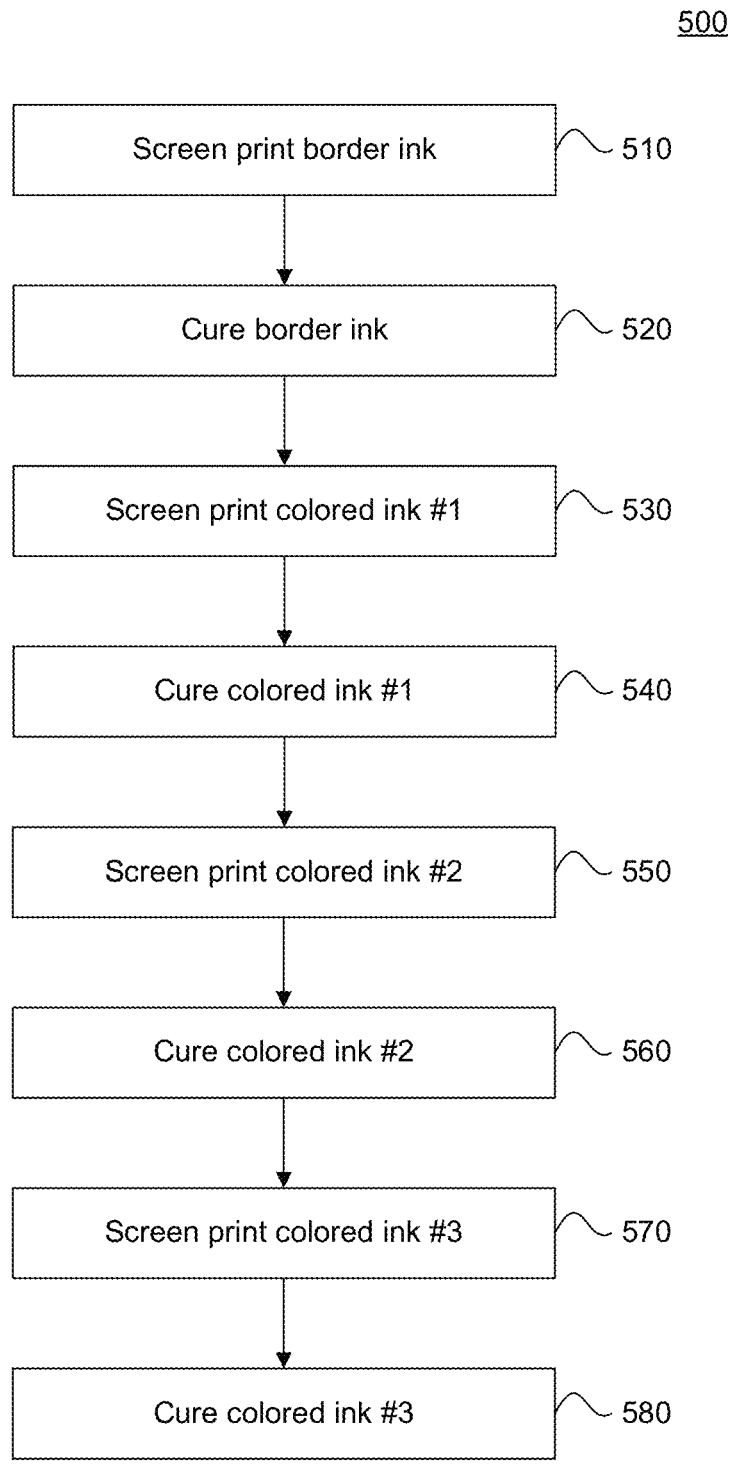
FIG. 5 illustrates a process to create the stack for a logo of FIG. 3B.

FIG. 5 illustrates a process 500 to create stack 350B for logo 120. For explanation purposes, FIG. 5 may be described with elements from previous figures. Process 500 includes creating a physical mask that is used for screen printing each color. After each colored ink is screen printed, the colored ink must be cured before proceeding.

At 510, black border ink is screen printed using a physical mask onto a coversheet. For example, border layer 110 of FIG. 3B is screen printed onto cover sheet 235 using a physical mask. Alternatively the border ink is not black, but some other opaque color.

At 520, the black border ink such as border layer 110 is cured which takes time and equipment.

At 530, a first colored ink is screen printed onto a coversheet using a physical mask. For example, color ink 342 of FIG. 3B is screen printed onto cover sheet 235 using a physical mask.

At 540, the first colored ink such as color ink 342 is cured.

At 550, a second colored ink is screen printed onto a coversheet using a physical mask. For example, color ink 344 of FIG. 3B is screen printed onto cover sheet 235 using a physical mask.

At 560, the second colored ink such as color ink 344 is cured.

At 570, a third colored ink is screen printed onto a coversheet using a physical mask. For example, color ink 346 of FIG. 3B is screen printed onto cover sheet 235 using a physical mask.

At 580, the third colored ink such as color ink 346 is cured.

Figure 6:
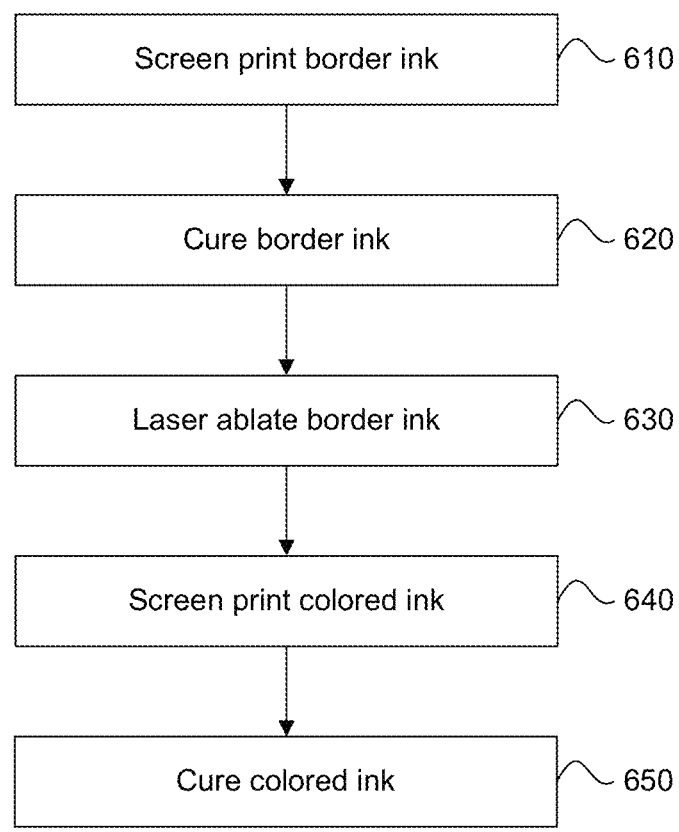
FIG. 6 illustrates an exemplary process to create the exemplary stack for a logo, according to an exemplary embodiment of the disclosure.

FIG. 6 illustrates an exemplary process 600 to create exemplary stack 350C for logo 120, according to an exemplary embodiment of the disclosure. For explanation purposes, FIG. 6 may be described with elements from previous figures.

At 610, black border ink is screen printed onto a coversheet using a physical mask. For example, using a physical mask, border layer 110 such as a black ink as shown in FIG. 3C, is screen printed onto cover sheet 235 of FIG. 3C. In an embodiment, the entire border area may be printed a solid color without any patterns.

At 620, border layer 110 such as a black border ink is cured.

At 630, one or more patterns are laser ablated onto the border ink layer such as border layer 110.

At 640, one and only one colored ink is screen printed using a physical mask onto a coversheet. For example, using a physical mask, color ink 374 is screen printed onto cover sheet 235 of FIG. 3C. In an embodiment, the physical mask may be a simple mask that does not require any fine detail or patterns.

At 650, one and only one colored ink such as colored ink 374 is cured.

By utilizing less colored ink, the number of physical masks, layers of colored ink printing, and curing are reduced. In addition, the quality of the logo and/or icon produced is more detailed than would be obtained by screen printing methods (such as the example shown in FIG. 5), and yet at lower costs than photolithography methods.

Figure 7A:
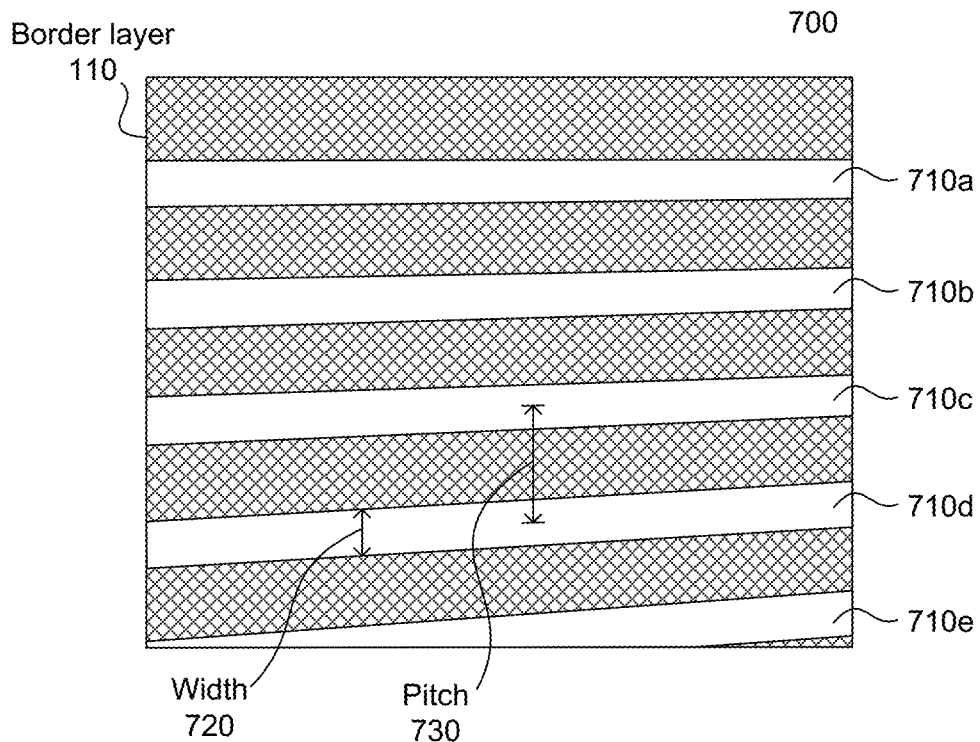
FIG. 7A illustrates an exemplary example of a laser-ablated pattern with laser-ablated lines, according to an exemplary embodiment of the disclosure.
Figure 7B:
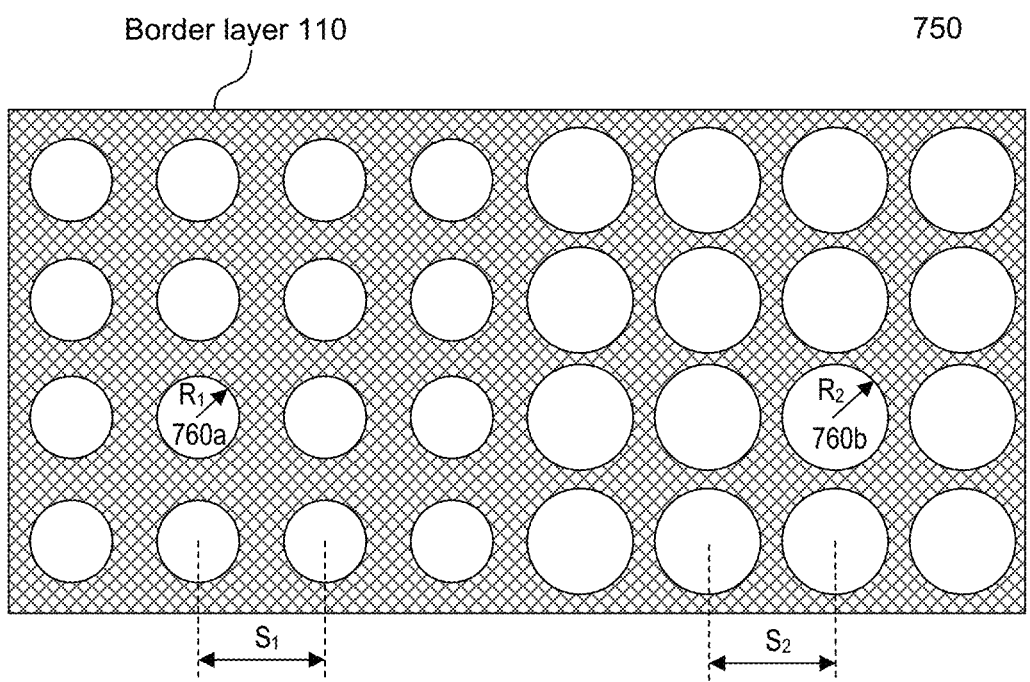
FIG. 7B illustrates an exemplary example of a laser-ablated pattern with laser-ablated dots, according to an exemplary embodiment of the disclosure.

As described with regards to FIG. 3C, border layer 110 may include ablated patterns such as ablated patterns 372 and 376. Ablated patterns may be designed using ablated lines and/or ablated dots. FIG. 7A illustrates an exemplary example of a laser-ablated pattern 700 with laser-ablated lines 710, according to an exemplary embodiment of the disclosure. FIG. 7B illustrates an exemplary example of a laser-ablated pattern 750 with laser-ablated dots 760, according to an exemplary embodiment of the disclosure. For explanation purposes, FIGS. 7A and 7B may be described with elements from previous figures. Commercially available lasers now routinely produce ablation line widths or dot diameters in the tens of microns range, e.g. 30 microns. This is much finer that can be perceived by the naked eye at a distance users typically view touch displays. As a result, a pattern of lines or dots with widths and spacings in the tens of microns range will be averaged out by the human eye and perceived as a region of partial transparency. Laser wavelengths may be in the visible or near-infrared range, such as 780 nm from a high-power AlGaAs diode laser. The time required to produce the laser-ablated pattern for a logo or icon may be of order of one minute, and will vary depending on the specific capabilities of the laser and the details of the laser ablation pattern. In the future, the capabilities of laser systems are expected to improve.

The laser-ablated patterns may be created with laser ablated lines of adjustable width. An example range includes line widths or dot widths of 0.026 mm to 0.035 mm. By changing the pitch of a laser-ablated line or a laser-ablated dot, the amount of the one and only one colored ink visible through the laser-ablated pattern varies. Thus, regions of a touchscreen may be laser-ablated to produce a translucent image (e.g., logo 120, icon 130.) Laser-ablated pattern 700 of FIG. 7A includes laser-ablated lines 710a-710e. For example, each laser-ablated line 710 indicates where border layer ink has been removed. In this example, width 720 of line 710d may be 0.031 mm. Pitch 730 can be measured as a distance from the center line of one laser-ablated line (e.g., 710c) to the center line of another laser-ablated line (e.g., 710d), and in this example the pitch of lines 710 is 0.078 mm. The translucency of laser-ablated pattern 700 is determined as the width of a laser-ablated line over the pitch of a laser ablated line. In this example, the translucency is 39.7% (e.g., 0.031/0.078=39.7%).

A laser-ablated pattern, a portion of which is illustrated in FIG. 7B, includes laser-ablated dots (e.g., 760a and 760b) within border layer 110. Each laser-ablated dot indicates where the border layer ink has been removed. In this example, the radii of the laser ablated dots vary, namely with a radius of $R_1$ to the left and a radius $R_2$ to the right. In this example, the laser-ablated dots are arranged in a square grid with a spacing of $S_1$ to the left and a spacing of $S_2$ to the right. Computing the faction of border layer area that is ablated, the resulting degree of transparency is $T_1$ to the left and a $T_2$ to the right where the transparencies may be computed using the formulas in FIG. 7B. For example, if the radius and spacing to the left is $R_1$=30 microns and $S_1$=100 microns then the averaged transparency is $T_1$=28% to the left. And, if the radius and spacing to the right is $R_2$=45 microns and $S_2$=100 microns, then the averaged transparency $T_2$=64%. Increasing the radius and/or decreasing the spacing increases transparency while decreasing the radius and/or increasing the spacing decreases the transparency. In other embodiments, the dot radii vary continuously leading gradients in transparency (as in FIG. 4). In other embodiments, the ablated dots are arranged on a grid that is not square, such as rectangular, hexagonal or honeycomb.

While laser-ablated pattern 700 includes laser-ablated lines and laser-ablated pattern 750 includes laser-ablated dots, laser-ablated patterns may include a combination of laser-ablated lines and laser-ablated dots. Further, the width of the lines and the diameters of the dots can vary as can their respective pitches, within the same laser-ablated pattern. This flexibility enables the creation of detailed logos and/or icons with continuous gradients that appear to the human eye as infinite number of shades of a single color.

While FIG. 3C illustrates embodiments in which a colored ink 374 is applied over the laser-ablated border layer, in other embodiments it may be desirable to provide a laser-ablated border layer with no associated colored ink.

Figure 8:
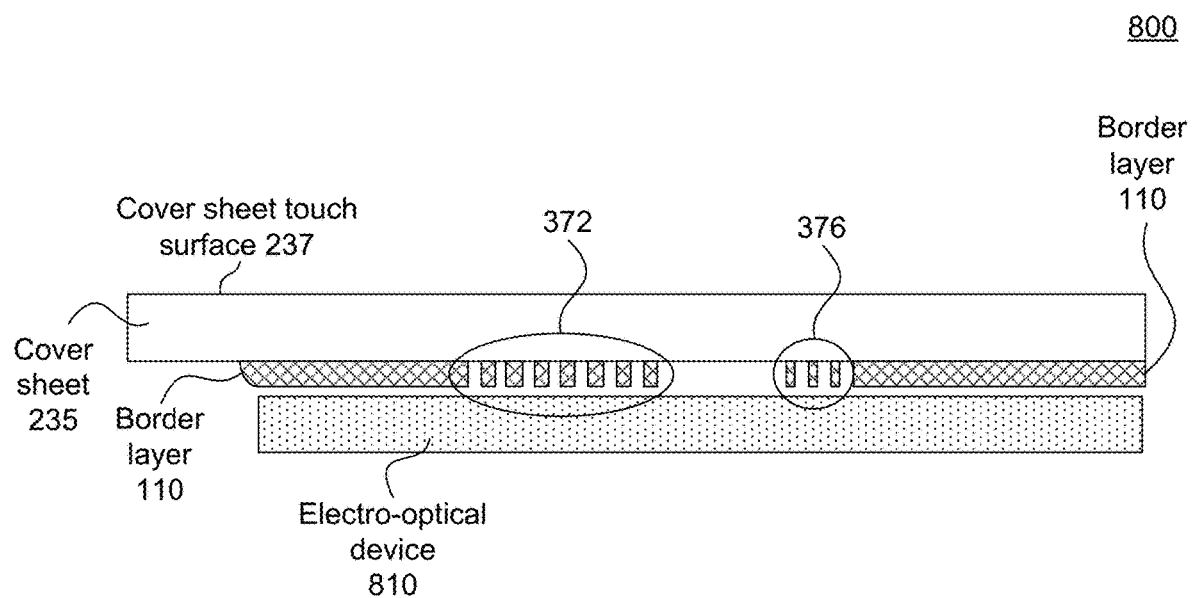
FIG. 8 illustrates an exemplary example of a laser-ablated pattern placed in front of an electro-optical device.

FIG. 8 illustrates a case where instead of a layer of colored ink there is an electro-optical device behind the laser-ablated pattern. The electro-optical device may be a light source such as an OLED (organic light emitting diode) element. In this case a logo would glow with the color of the light source. The electro-optical device may also be a programmable display such as an LCD (liquid crystal display) or an OLED display, in which case the laser-ablation pattern would modify the image from the programmable display. Furthermore, the electro-optical device may be a light sensing device such as a camera or a fingerprint sensor. In some embodiments, the pattern that is ablated is positioned in front of a liquid crystal display (LCD), where a combination of the pattern that is ablated and a line of pixels of the LCD, avoids a moiré pattern.

If the electro-optical device, such as a programmable display or camera, includes a pixel array, there is a risk of forming undesired moiré patterns due to the interaction between the laser-ablation pattern and the electro-optical device pixel pattern. In such cases, undesired moiré patterns may be suppressed or eliminated by an appropriate choice of laser-ablation pattern. Moiré patterns are minimized when the two-dimensional Fourier transform has no strong peaks at two-dimension wavenumbers close to strong peaks in the two-dimensional Fourier transform of the electro-optical device pixel pattern. For example, for the laser-ablation pattern of FIG. 7A, the locations of the peaks of the two-dimensional Fourier transform may be adjusted by adjusting the pitch 730 of the ablation lines 710 as well as by adjusting the tilt angle of the ablation lines 710. Referring to FIG. 7B, tuning to suppress moiré patterns may be accomplished by adjusting the grid spacing as well as rotating (e.g. tilting) the square grid with which the ablation dots are arranged.

Figure 9:
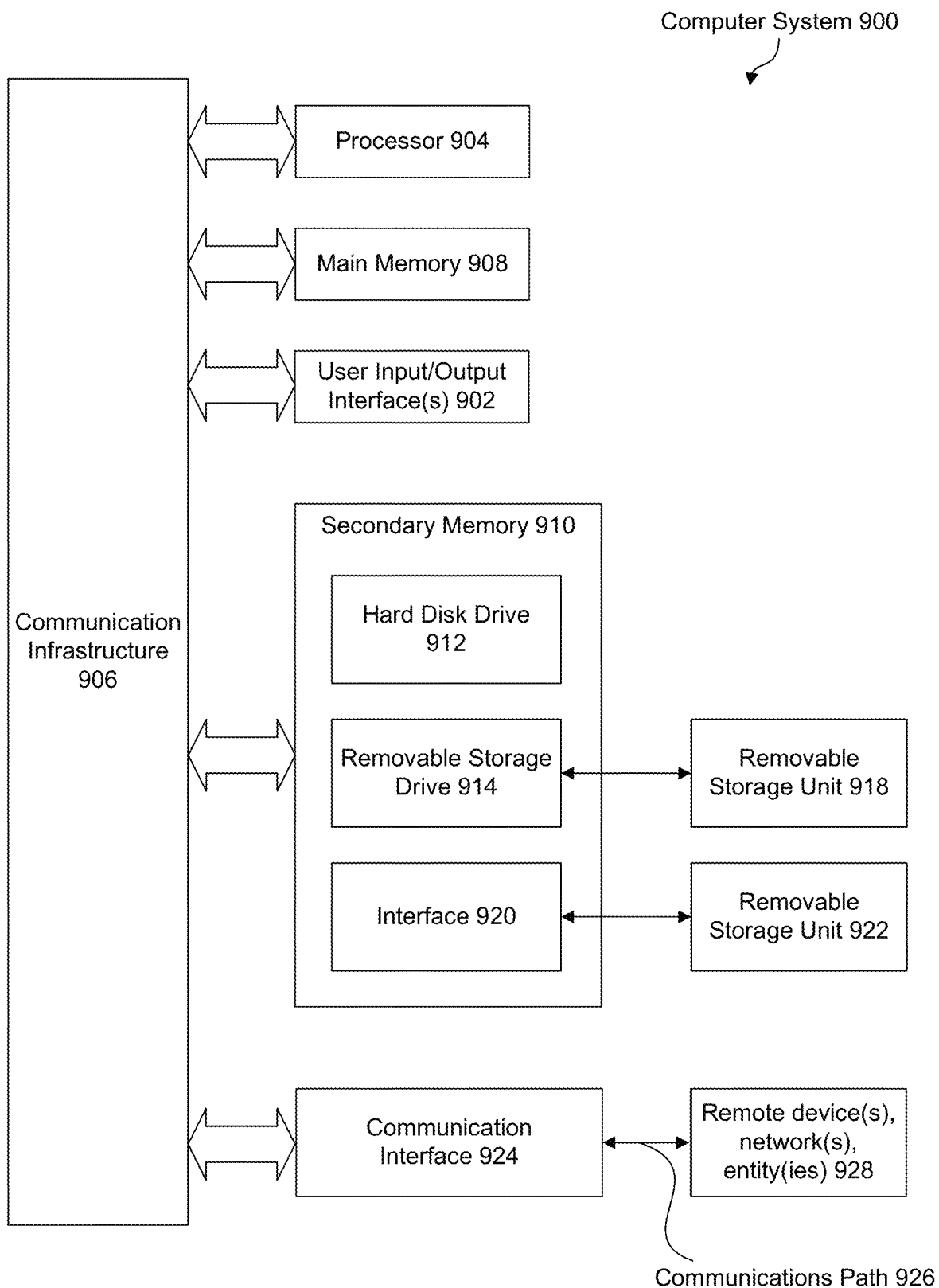
FIG. 9 illustrates an example computer system useful for implementing various embodiments.

Various embodiments can be implemented, for example, using one or more well-known computer systems, such as computer system 900 shown in FIG. 9. Computer system 900 can be any well-known computer capable of performing the functions described herein such as PCAP touchscreen 100 of FIG. 1 and/or display device 210. Computer system 900 may be internal or external to PCAP touchscreen 100 and/or display device 210 as discussed above. For example, portions of computer system 900 may be included as PCAP touchscreen 100 and/or display device 210. In addition, PCAP touchscreen 100 may be used in conjunction with another computer system 900.

Computer system 900 includes one or more processors (also called central processing units, or CPUs), such as a processor 904. Processor 904 is connected to a communication infrastructure or bus 906. One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 900 also includes user input/output device(s) 902, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data. Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired, and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A projected capacitive (PCAP) touchscreen layered structure, comprising:
   a cover sheet;
   a border component coupled to the cover sheet;
   one colored ink coupled to the border component, wherein an ablated pattern of the border component yields more than one hue of the one colored ink on the cover sheet, wherein the ablated pattern comprises an ablated line, wherein a translucency of the ablated pattern is determined by a first width of the ablated line divided by a pitch of the ablated line; and
   an electro-optical device including a programmable display positioned behind the ablated pattern, wherein a combination of the ablated pattern and the programmable display suppress a moiré pattern.

2. The PCAP touchscreen layered structure of claim 1, wherein the border component comprises two or more colored border-layer components.

3. The PCAP touchscreen layered structure of claim 1, wherein the border component is opaque or black.

4. The PCAP touchscreen layered structure of claim 1, wherein the one colored ink is translucent or opaque.

5. The PCAP touchscreen layered structure of claim 1, wherein the one colored ink appears as a gradient as a result of the ablated pattern.

6. The PCAP touchscreen layered structure of claim 1, wherein the pitch of the ablated line comprises a distance measured from a center of the ablated line to a center of an adjacent ablated line.

7. The PCAP touchscreen layered structure of claim 1, wherein the ablated pattern includes the first width of the ablated line, and a second width of a second ablated line, wherein the second width of the second ablated line is smaller than the first width of the ablated line.

8. The PCAP touchscreen layered structure of claim 1, wherein the cover sheet comprises glass or film.

9. The PCAP touchscreen layered structure of claim 1, further comprising a circuitry layer coupled to the cover sheet and the border component.

10. The PCAP touchscreen layered structure of claim 9, wherein the circuitry layer comprises: indium-tin-oxide (ITO), silver, or metal mesh.

11. A method for a projected capacitive (PCAP) touchscreen layered structure, comprising:
    screen printing a border component on a cover sheet;
    curing the border component;
    ablating a pattern on the border component, wherein the ablated pattern comprises an ablated line, wherein a translucency of the ablated pattern is determined by a first width of the ablated line divided by a pitch of the ablated line; and
    screen printing one colored ink onto the ablated pattern on the border component to yield more than one hue of the one colored ink on the cover sheet, wherein a combination of the ablated pattern and a programmable display positioned behind the ablated pattern, suppress a moiré pattern.

12. The method of claim 11, wherein the border component comprises two or more colored border-layer components, and wherein the more than one hue of the one colored ink yielded exceeds a sum of the two or more colored border-layer components and the one colored ink.

13. The method of claim 11, wherein the one colored ink is translucent or opaque, and wherein the more than one hue of the one colored ink appears as a gradient of the one colored ink on the cover sheet.

14. The PCAP touchscreen layered structure of claim 1, wherein to suppress the moiré pattern, the ablated line is adjusted according to a tilt angle.

15. A projected capacitive (PCAP) touchscreen layered structure, comprising:
    a cover sheet;
    a border component coupled to the cover sheet;
    one colored ink coupled to the border component, wherein an ablated pattern of the border component yields more than one hue of the one colored ink on the cover sheet, wherein the ablated pattern comprises an ablated dot, wherein a translucency of the ablated pattern is based on a diameter of the ablated dot and a pitch of the ablated dot; and
    an electro-optical device including a programmable display positioned behind a second ablated pattern of the border component, wherein a combination of the second ablated pattern and the programmable display suppress a moiré pattern.

16. The PCAP touchscreen layered structure of claim 15, wherein the translucency of the ablated pattern is based on a square of a radius of the ablated dot, divided by a square of the pitch of the ablated dot.

17. The PCAP touchscreen layered structure of claim 15, wherein the ablated pattern includes the diameter of the ablated dot and a second diameter of a second ablated dot, wherein the second diameter of the second ablated dot is smaller than the diameter of the ablated dot.

18. The method of claim 11, wherein to suppress the moiré pattern, the ablated line is adjusted according to a tilt angle.

19. The method of claim 11, wherein the pitch of the ablated line comprises a distance measured from a center of the ablated line to a center of an adjacent ablated line.

20. The method of claim 11, wherein the ablated pattern includes the first width of the ablated line, and a second width of a second ablated line, wherein the second width of the second ablated line is smaller than the first width of the ablated line.

\* \* \* \* \*

UNITED STATES PATENT AND TRADEMARK OFFICE
CERTIFICATE OF CORRECTION

PATENT NO. : 11,353,995 B2  
APPLICATION NO. : 16/384523  
DATED : June 7, 2022  
INVENTOR(S) : Wang et al.

Page 1 of 1

It is certified that error appears in the above-identified patent and that said Letters Patent is hereby corrected as shown below:

On the Title Page

In References Cited item (56), replace "2009/0130607 A1* 5/2009 Slater" with --2009/0130607 A1* 5/2009 Slafer--.
In References Cited item (56), add U.S. Patent Reference --2017/0247289 A1 08/2017 Waldschmidt et al.--.
In References Cited item (56), add foreign patent document --EP 3 396 424 A2 10/2018--.

Signed and Sealed this  
Thirteenth Day of September, 2022

Katherine Kelly Vidal  
*Director of the United States Patent and Trademark Office*